(12) United States Patent
Zhang

(10) Patent No.: US 8,493,048 B2
(45) Date of Patent: *Jul. 23, 2013

(54) CONSTANT ON-TIME SWITCHING REGULATOR IMPLEMENTING LIGHT LOAD CONTROL

(75) Inventor: Zhiye Zhang, San Jose, CA (US)

(73) Assignee: Alpha and Omega Semiconductor Incorporated, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/426,201

(22) Filed: Mar. 21, 2012

(65) Prior Publication Data

US 2012/0299569 A1    Nov. 29, 2012

Related U.S. Application Data

(63) Continuation-in-part of application No. 13/113,981, filed on May 23, 2011.

(51) Int. Cl.
*G05F 1/00* (2006.01)
(52) U.S. Cl.
USPC .......................................... 323/284
(58) Field of Classification Search
USPC ................................. 323/282–285
See application file for complete search history.

(56) References Cited

U.S. PATENT DOCUMENTS

| 7,045,993 B1 * | 5/2006 | Tomiyoshi | 323/224 |
| 7,936,160 B1 * | 5/2011 | Sheehan | 323/285 |
| 2008/0030181 A1 * | 2/2008 | Liu et al. | 323/283 |
| 2008/0061750 A1 * | 3/2008 | Stoichita | 323/271 |
| 2010/0080024 A1 * | 4/2010 | Wei et al. | 363/74 |

FOREIGN PATENT DOCUMENTS

JP    07234162 A   *  9/1995

* cited by examiner

*Primary Examiner* — Jue Zhang
(74) *Attorney, Agent, or Firm* — Van Pelt, Yi & James LLP

(57) ABSTRACT

A control circuit for a switching regulator implements constant on-time control scheme with synchronous rectification and applies an integrated standard and light load control loop to improve light load efficiency and enhance transient response. In one embodiment, the control circuit includes a reference voltage selection circuit configured to select, based on a low-side current signal, a first reference voltage for standard load condition and a second reference voltage for light load condition as a selected reference voltage. The second reference voltage is greater than the first reference voltage. The control circuit further includes a control loop configured to generate a control signal to turn on the main switch when the feedback voltage is below the selected reference voltage and the minimum off-time duration has expired.

17 Claims, 8 Drawing Sheets

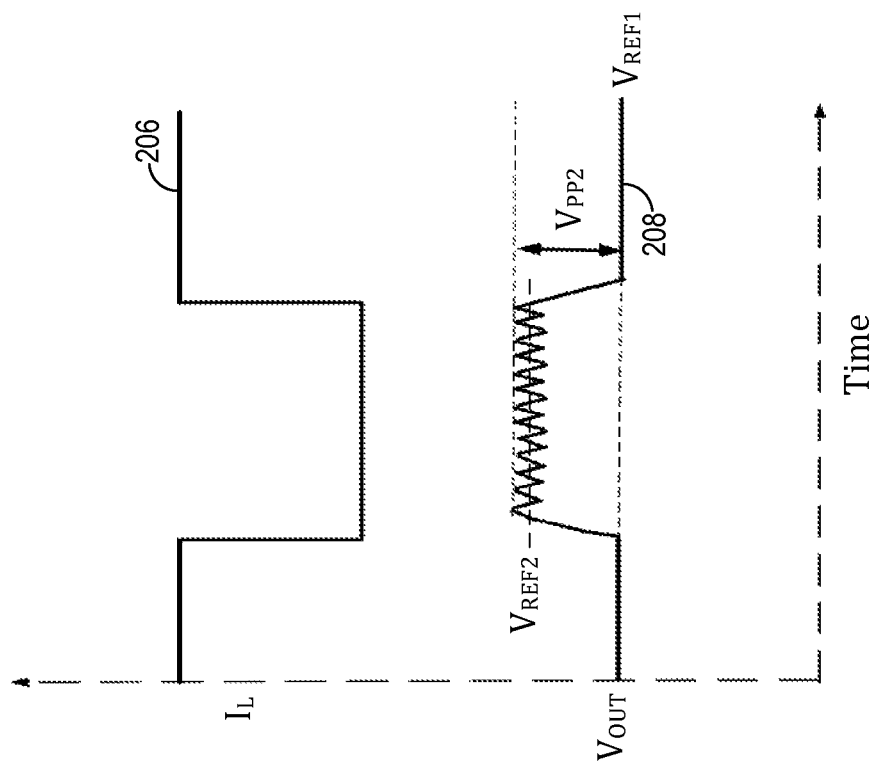
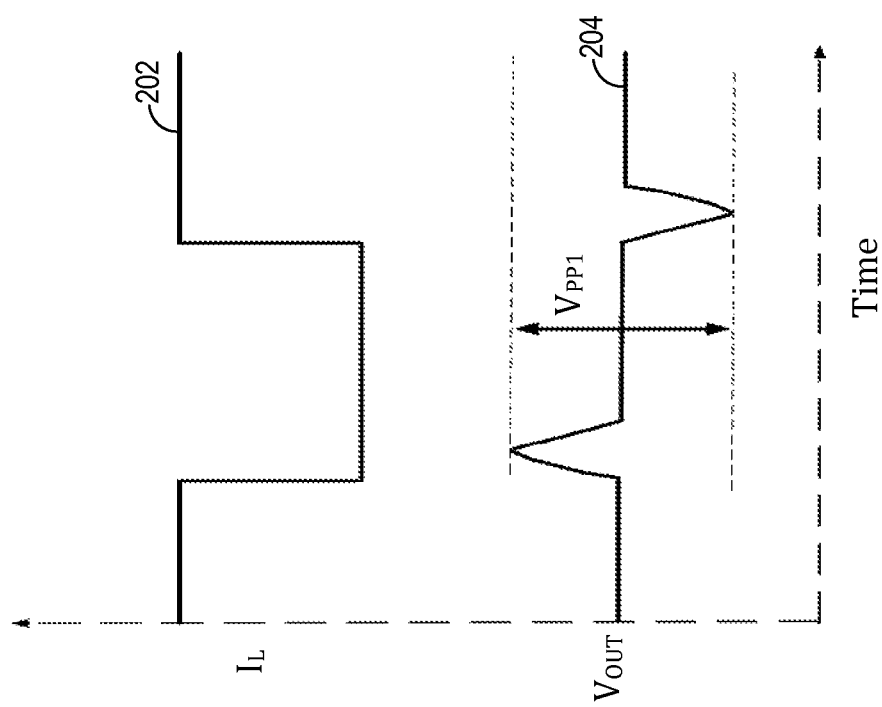
Fig. 5(b)
Fig. 5(a)

CONSTANT ON-TIME SWITCHING REGULATOR IMPLEMENTING LIGHT LOAD CONTROL

CROSS-REFERENCE TO RELATED APPLICATIONS

This application is a continuation-in-part of U.S. patent application Ser. No. 13/113,981, filed on May 23, 2011, which application is incorporated herein by reference in its entirety.

FIELD OF THE INVENTION

The invention relates to switching regulators or DC-to-DC converters and, in particular, to a switching regulator implementing constant on-time control and incorporating a control scheme to improve light load efficiency and enhanced transient response.

DESCRIPTION OF THE RELATED ART

DC voltage regulators or switching regulators operate to convert energy from one DC voltage level to another DC voltage level. This type of switching regulators is also referred to as DC/DC converters or switch mode power supplies. A switching regulator provides power supply function through low loss components such as capacitors, inductors, and transformers, and power switches that are turned on and off to transfer energy from the input to the output in discrete packets. A feedback control circuit is used to regulate the energy transfer to maintain a constant output voltage within the desired load limits of the circuit.

A switching regulator can be configured to step up the input voltage or step down the input voltage or both. Specifically, a buck switching regulator, also called a "buck converter," steps down the input voltage while a boost switching regulator, also called a "boost converter," steps up the input voltage. A buck-boost switching regulator, or buck-boost converter, provides both step-up and step-down functions.

The operation of the conventional switching regulator is well known and is generalized as follows. A power switch is turned on periodically to apply energy to an inductor of an output filter circuit to allow the current through the inductor to build up. When the power switch is turned off, the voltage across the inductor reverses and charges are transferred onto an output capacitor of the output filter circuit and the load. A relatively constant output voltage is maintained by the output capacitor. A second power switch is sometimes used for synchronous control operation. In operation, the main power switch, also referred to as the high-side switch, is turned on while the second power switch, also referred to as the low-side switch, is turned off, and vice versa.

Switching regulators include a control circuit which typically uses an error amplifier to compare the output voltage with a reference voltage and the control circuit generates one or more control signals that control the switching frequency (pulse frequency modulation) or the pulse width (pulse width modulation) of the on-off switching cycle. Many different control schemes have been applied to control the duty cycle (i.e., the on-time) of the main power switch. A constant on-time (or fixed on-time) control scheme is one type of control schemes where the on-time of the main power switch of the switching regulator is kept constant and the off time of the main power switch is varied to generate the desired output voltage.

FIG. 1 is a schematic diagram of a conventional switching regulator implementing a constant on-time control scheme. In switching regulator 10, a main power switch M1 and a diode D1 are connected in parallel between the input voltage $V_{IN}$ (node 12) and the ground potential. Power switch M1 operates to switch the input voltage $V_{IN}$ to an inductor L1 periodically to charge inductor L1. When the main power switch is turned off, the energy stored in the inductor L1 is transferred to an output capacitor $C_{OUT}$ and a load 18 and a substantially constant output voltage $V_{OUT}$ is maintained.

A regulator control circuit 20 is configured to drive the main power switch M1 according to a constant on-time control scheme. In operation, the main power switch M1 is turned on for a fixed time duration as determined by an one-shot timer 26 and switch M1 is then turned off. The output voltage $V_{OUT}$ (node 16) is monitored through a feedback loop. More specifically, the output voltage $V_{OUT}$ is fed back to the regulator control circuit 20 as a feedback voltage $V_{FB}$. The feedback voltage $V_{FB}$ is compared with a reference voltage $V_{REF}$ at a voltage comparator 22. The output of the voltage comparator 22 is gated with the output of a minimum off-time timer 30 at an AND logic gate 24. After the main power switch M1 has been turned off for at least the minimum off-time, when the output voltage $V_{OUT}$ decreases below the reference voltage $V_{REF}$, AND gate 24 will trigger the one-shot timer 26 to turn on the main power switch M1 again for the fixed on-time duration. The conventional switching regulator 10 realizes fast transient response but the efficiency of the regulator is affected by the power loss through the diode. Power is dissipated when the current flow through the diode while the diode is forward biased. This power loss reduces overall efficiency of the switching regulator.

To minimize power loss through the low-side diode, some switching regulators use a low-side switch in place of the diode, implementing what is referred to as "synchronous rectification." FIG. 2 is a schematic diagram of a conventional switching regulator implementing a constant on-time control scheme and synchronous rectification. The low-side diode is replaced with a low-side power switch M2 and is driven by the inverse of the drive signal (node 32) driving the main power switch M1. Thus, the low-side power switch M2 is turned on when the main power switch M1 is turned off and vice versa. Power dissipation when the low side switch is forward biased is eliminated. When synchronous rectification is used, the efficiency at heavy load is good. However, the efficiency at light load is very poor due to negative current from the inductor L1 flowing into the low-side power switch M2.

In some regulator control circuits implementing synchronous rectification, the light load efficiency is improved by using a negative current detector to detect the presence of negative current flowing into the low-side power switch. FIG. 3 is a schematic diagram of a conventional switching regulator implementing a constant on-time control scheme and synchronous rectification with a negative current detector 64. When light load condition causes negative current to flow into the low-side switch M2, an AND logic gate 62 will cause the low-side switch M2 to turn off. The body diode of the low-side power switch M2 is reversed bias to provide current blocking. Thus, current through the low-side power switch M2 is allowed to flow from source to drain only, not from drain to source. In this manner, light load efficiency of the switching regulator 80 improves. However, transient response of the switching regulator circuit 80 is usually very large. Large voltage spikes at the regulator output voltage when load current changes are undesirable.

SUMMARY OF THE INVENTION

According to one embodiment of the present invention, a control circuit for a switching regulator receiving an input voltage where the control circuit controls a main switch and a low-side switch using a constant on-time control scheme is described. The main switch and the low-side switch drive a switch output node for generating a switching output voltage. The switch output node is coupled to an LC filter circuit to generate a regulated output voltage having a substantially constant magnitude on an output node. The regulated output voltage is fed back to the control circuit as a feedback voltage. The control circuit includes a first one-shot timer configured to generate a control signal indicative of a fixed on time duration of the main switch where the control signal is applied to turn on the main switch while turning off the low-side switch and to turn off the main switch after the fixed on-time duration has expired while turning on the low-side switch, a minimum off-time timer configured to generate a minimum off-time signal having a first state when the main switch has been turned off for a minimum off-time duration, a reference voltage selection circuit configured to select, based on a low-side current signal, a first reference voltage for standard load condition and a second reference voltage VREF2 for light load condition as a selected reference voltage where the low-side current signal has a first state indicative of a light load condition at the output node and the second reference voltage is greater than the first reference voltage, and a control loop configured to control the first one-shot timer to generate the control signal to turn on the main switch when the feedback voltage is below the selected reference voltage and the minimum off-time signal has the first state.

According to another aspect of the present invention, a method in a switching regulator receiving an input voltage and controlling a main switch and a low-side switch using a constant on-time control scheme is described. The main switch and the low-side switch drive a switch output node for generating a switching output voltage. The switch output node is coupled to an LC filter circuit to generate a regulated output voltage having a substantially constant magnitude on an output node. The regulated output voltage is fed back to the switching regulator as a feedback voltage. The method includes turning on the main switch for a fixed on-time duration and turning off the low-side switch in response to a control signal; turning off the main switch for a minimum off-time duration and turning on the low-side switch in response to the control signal; selecting, based on a low-side current signal, a first reference voltage for standard load condition and a second reference voltage for light load condition as a selected reference voltage where the low-side current signal has a first state indicative of a light load condition at the output node and the second reference voltage is greater than the first reference voltage; and generating the control signal to turn on the main switch based on a control loop when the feedback voltage is below the selected reference voltage and the minimum off-time duration has expired.

The present invention is better understood upon consideration of the detailed description below and the accompanying drawings.

BRIEF DESCRIPTION OF THE DRAWINGS

FIGS. 5(a) and 5(b) illustrate the current and voltage waveforms for a conventional switching regulator with synchronous rectification (FIGS. 2 and 3) and for the switching regulator with the dual control loops (FIG. 4), respectively.

DETAILED DESCRIPTION OF THE PREFERRED EMBODIMENTS

In accordance with the principles of the present invention, a switching regulator implementing synchronous rectification and a constant on-time control scheme incorporates dual control loops to control the regulated output voltage so as to improve light load efficiency as well as to enhance the transient response. More specifically, the constant on-time switching regulator includes a standard control loop and a light load control loop. The standard control loop operates to regulate the output voltage under the conventional constant on-time control scheme. The light load control loop is activated when light load condition is detected to improve both the light load efficiency as well as ensure fast transient response.

In other embodiments, a switching regulator implementing synchronous rectification and a constant on-time control scheme implements an integrated standard and light load control loop using a single comparator. The integrated standard and light load control loop regulates the regulated output voltage so as to improve light load efficiency as well as to enhance the transient response. The integrated standard and light load control loop includes a reference voltage selection circuit operative to select a first reference voltage for standard load control and a second reference voltage for light load control. In this manner, light load efficiency is improved and fast transient response is realized while the control loop circuitry is simplified.

Figure 4:
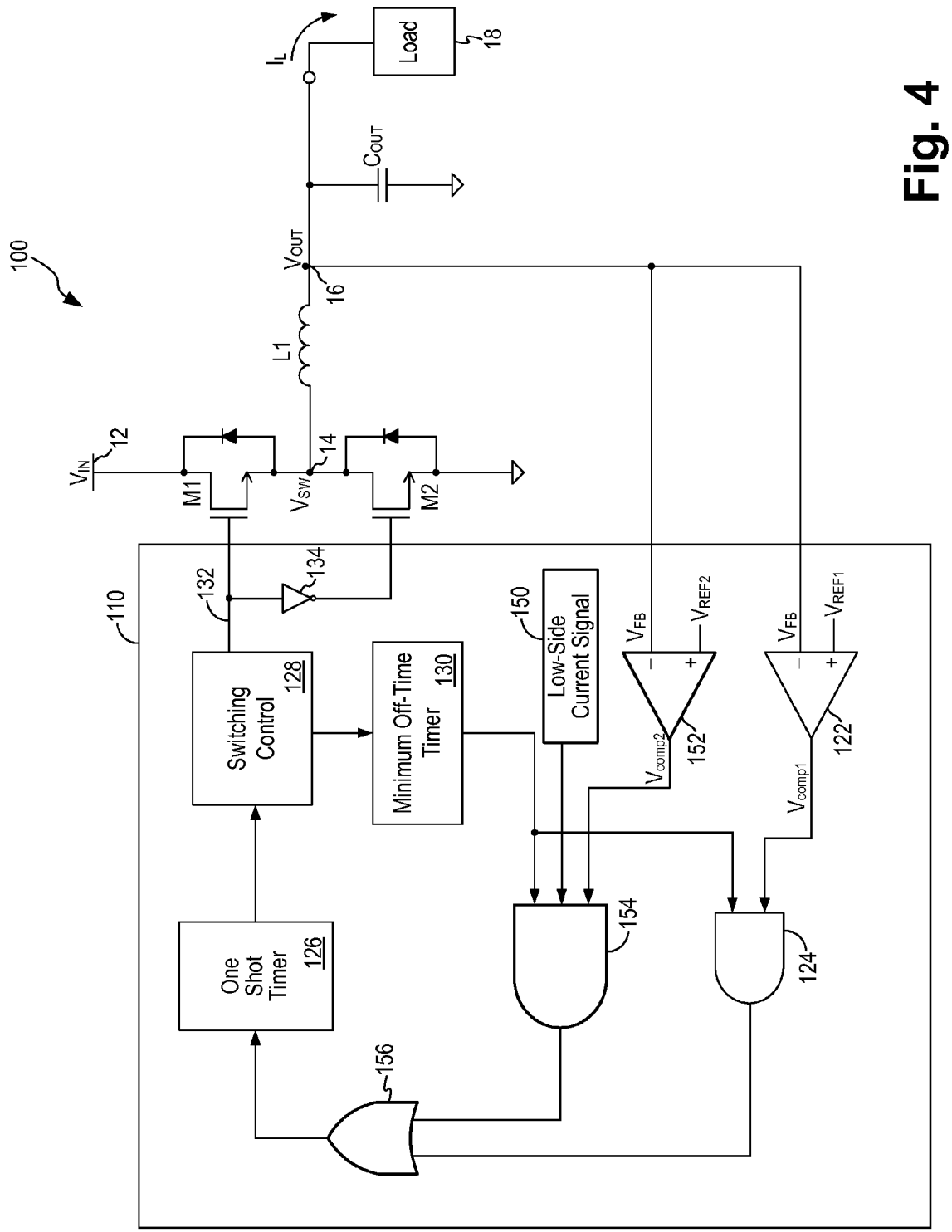
FIG. 4 is a schematic diagram of a switching regulator implementing synchronous rectification and constant on-time control scheme and incorporating dual control loops according to one embodiment of the present invention.

FIG. 4 is a schematic diagram of a switching regulator implementing synchronous rectification and constant on-time control scheme and incorporating dual control loops according to one embodiment of the present invention. Referring to FIG. 4, a switching regulator 100 includes a regulator control circuit 110 driving a main power switch M1 and a low-side power switch M2 connected in series between the input voltage $V_{IN}$ (node 12) and ground. In the present embodiment, power switches M1 and M2 are both NMOS transistor and the low-side power switch M2 is controlled by the inverse of a drive signal (node 132) driving the main power switch M1. For instance, the drive signal at node 132 may be inverted by an inverter 134 and the inverted drive signal is coupled to drive the low-side power switch M2. Thus, the low-side power switch M2 is turned on when the main power switch M1 is turned off and vice versa. The power switches M1 and M2 are turned on and off to generate a switching voltage $V_{SW}$ on a common node 14. The switching voltage $V_{SW}$ at node 14 drives an output LC filter circuit formed by an inductor L1 and an output capacitor $C_{OUT}$. The output LC filter circuit generates a DC output voltage $V_{OUT}$ at an output voltage node 16 having substantially constant magnitude. In operation, the output voltage $V_{OUT}$ is coupled to drive a load 18, as shown in FIG. 4.

The regulator control circuit 110 is configured to drive the main power switch M1 and the low-side power switch M2 based on a constant on-time control scheme. Under the constant on-time control scheme, the main power switch M1 is turned on for a fixed time duration as determined by an one-shot timer 126 and then power switch M1 is turned off for at least a minimum amount of off-time as determined by the minimum off-time timer 130. In operation, the one-shot timer 126 generates control signals for a switching control circuit 128 which generates the drive signal (node 132) for turning on the main power switch M1, and thus turning off the low-side power switch M2. When the fixed on-time duration set by the one-shot timer 126 expires, the switching control circuit 128 generates the drive signal (node 132) to turn off the main power switch M1, and thus turning on the low-side power switch M2. The switching control circuit 128 also sends a signal to trigger the minimum off-time timer 130 to count down the predetermined minimum off-time duration. The minimum off-time timer 130 asserts a minimum off-time output signal when the minimum off-time timer expires, that is, the minimum off-time duration has passed.

In embodiments of the present invention, the regulator control circuit 110 implements two control loops to regulate the output voltage $V_{OUT}$ at the output node 16. A feedback circuit is formed by coupling the output voltage $V_{OUT}$ (node 16) back to the regulator control circuit 110 as a feedback voltage $V_{FB}$. The feedback voltage $V_{FB}$ is coupled to both the standard control loop and the light load control loop to implement output voltage regulation.

In the standard control loop, the feedback voltage $V_{FB}$ is coupled to a first voltage comparator 122 to be compared with a reference voltage $V_{REF1}$. The output signal $W_{COMP1}$ of the voltage comparator 122 is asserted when the feedback voltage $V_{FB}$ drops below the reference voltage $V_{REF1}$. The comparator output signal $V_{COMP1}$ and the minimum off-time signal from timer 130 are coupled to a AND logic gate 124. When both of the conditions are met, that is when the feedback voltage $V_{FB}$ has dropped below the reference voltage $V_{REF1}$ and the minimum off-time has expired, the output of the AND gate 124 is asserted. The output of AND gate 124 is coupled to an OR logic gate 156 and OR gate 156 controls the one-shot timer 126. Thus, when AND gate 124 asserts its output, OR gate 156 asserts its output, regardless of the state of the other input to the OR gate, and the one-shot timer 126 is triggered and the switching control circuit 128 acts in response to generate the drive signal (node 132) to turn on the main power switch M1. The standard control loop thus operates to regulate the output voltage $V_{OUT}$ through a constant on-time control scheme where the main power switch is turned on for a fixed on-time duration and is turned off until the output voltage $V_{OUT}$ drops below the reference voltage $V_{REF1}$.

Regulator control circuit 110 further includes a light load control loop which is activated during light load conditions to improve efficiency and enhance transient response. In the light load control loop, the feedback voltage $V_{FB}$ is coupled to a second voltage comparator 152 to be compared with a reference voltage $V_{REF2}$. The output signal $V_{COMP2}$ of the voltage comparator 152 is asserted when the feedback voltage $V_{FB}$ drops below the reference voltage $V_{REF2}$. The reference voltage $V_{REF2}$ defines an upper voltage level that the output voltage $V_{OUT}$ can reach during light load conditions, as will be explained in more detail below. In embodiments of the present invention, the reference voltage $V_{REF2}$ has a voltage value greater than the reference voltage $V_{REF1}$.

The light load control loop further includes an AND logic gate 154 receiving three input signals. More specifically, the AND gate 154 receives the comparator output signal $V_{COMP2}$ from the voltage comparator 152 and the minimum off-time signal from timer 130 as the first two input signals. The AND gate 154 further receives a low-side current signal 150 as the third input signal. The low-side current signal 150 is indicative of the current flowing through the drain-to-source terminal of the power switch M2. In embodiments of the present invention, the low-side current signal 150 may be generated by a current monitoring circuit (not shown), such as a circuit monitoring the drain-to-source voltage (Vds) of the power switch M2. When the switching regulator 100 experiences a light load condition, the current throwing through the power switch M2 drops. In one embodiment, the low-side current signal 150 is asserted when the current flowing through the power switch M2 drops below a given threshold level, indicating a light load condition. When all three of the input signals to the AND gate 154 are asserted, the output of AND gate 154 is then asserted. The output of AND gate 154 forms the other input to OR gate 156. Thus, when the output of AND gate 154 is asserted, OR gate 156 asserts its output and the one-shot timer 126 is triggered and the switching control circuit 128 acts in response to generate the drive signal (node 132) to turn on the main power switch M1.

The operation of the light load control loop will now be described in detail. When the load condition at the output node 16 is normal or heavy, the current flow through the power switch M2 is sufficiently large so that the low-side current signal 150 will not be asserted. Thus, the light load control loop is not active and the standard control loop controls the operation of the power switches M1 and M2 through the constant on-time control scheme with synchronous rectification, as described above. That is, the main power switch M1 is turned on (the low-side power switch M2 turned off) for a fixed on-time duration as determined by the one-shot timer 126. The main power switch M1 is then turned off for at least the minimum off-time as determined by the minimum off-time timer 130. Meanwhile, the low-side power switch M2 is turned on. After the minimum off-time, when the output voltage $V_{OUT}$ is greater than the reference voltage $V_{REF1}$, the main power switch remains turned off. When the output voltage $V_{OUT}$ drops lower than the reference voltage $V_{REF1}$, then AND gate 124 is asserted to trigger the one-shot timer 126 to cause the main power switch M1 to be turned on for another fixed on-time duration. The operation of the standard control loop with synchronous rectification continues.

However, when the switching regulator 100 experiences a light load condition at the output node 16, the light load control loop is activated. The light load control loop will cause the main power switch M1 to turn on during light load conditions, which has the effect of increasing the efficiency and also improving the transient response of the switching regulator 100.

More specifically, when the main power switch M1 is turned off while the low-side power switch M2 is turned on and after the minimum off-time has expired, if the switching regulator 100 experiences a light load condition, the low-side current signal 150 is asserted to indicate that the current through the low-side power switch M2 is low, such as lower than a threshold value. If the feedback voltage $V_{FB}$ is also lower than the reference voltage $V_{REF2}$, all three input signals of the AND gate 154 are asserted and the output signal of the AND gate 154 will then be asserted to turn the main power switch M1 on for the fixed on-time duration (and the low-side power switch M2 is turned off). When the feedback voltage $V_{FB}$ becomes greater than the reference voltage $V_{REF2}$, the comparator output signal $V_{COMP2}$ is deasserted and the output of AND gate 154 is deasserted to stop the one-shot timer 126 from turning on the main power switch M1 again. The light load control loop continues where the main power switch M1 is turned on when light load is detected by the low-side current signal 150 and when the feedback voltage $V_{FB}$ drops below the reference voltage $V_{REF2}$.

As thus operated, the light load control loop causes the main power switch to turn on periodically during light load condition to maintain the output voltage $V_{OUT}$ about the reference voltage $V_{REF2}$. The output voltage $V_{OUT}$ at light load conditions is maintained at a voltage level greater than the output voltage level at normal or heavy load. FIGS. 5(a) and 5(b) illustrate the current and voltage waveforms for a conventional switching regulator with synchronous rectification and for the switching regulator with the dual control loops (FIG. 4), respectively. Referring first to FIG. 5(a), the load current behavior at a conventional switching regulator is shown by curve 202. The load current $I_L$ was at a normal level and then decreases due to light load condition and eventually returns to normal load condition. In a conventional switching regulator, such as the switching regulators implementing synchronous rectification of FIGS. 2 and 3, the output voltage $V_{OUT}$ experiences transients when the load current $I_L$ undergoes large changes, as shown by curve 204 in FIG. 5(a). The large transient responses lead to a large voltage swing $V_{PP1}$ about the regulated output voltage level. The large transient voltage swing at the output voltage $V_{OUT}$ is not desirable.

On the other hand, the switching regulator 100 with dual control loops (FIG. 4) is capable of handling light load conditions without large transients at the output voltage $V_{OUT}$. Referring to FIG. 5(b), when the load current $I_L$ (curve 206) drops due to light load conditions, the light load control loop in switching regulator 100 turns on the main power switch M1 and therefore allows the output voltage $V_{OUT}$ to charge up to the reference voltage $V_{REF2}$. While the load current $I_L$ remains at a light load level, the light load control loop will maintain the output voltage about the reference voltage $V_{REF2}$ having a voltage value greater than the output voltage during normal or heavy load conditions. When the load current $I_L$ returns to normal load conditions, the light load control loop is deactivated and the standard control loop resumes to regulate the output voltage $V_{OUT}$ about the reference voltage $V_{REF1}$. In this manner, the voltage transient due to the load current changes are limited to a voltage swing of $V_{PP2}$ which is substantially smaller than the voltage swing $V_{PP1}$.

Figure 1:
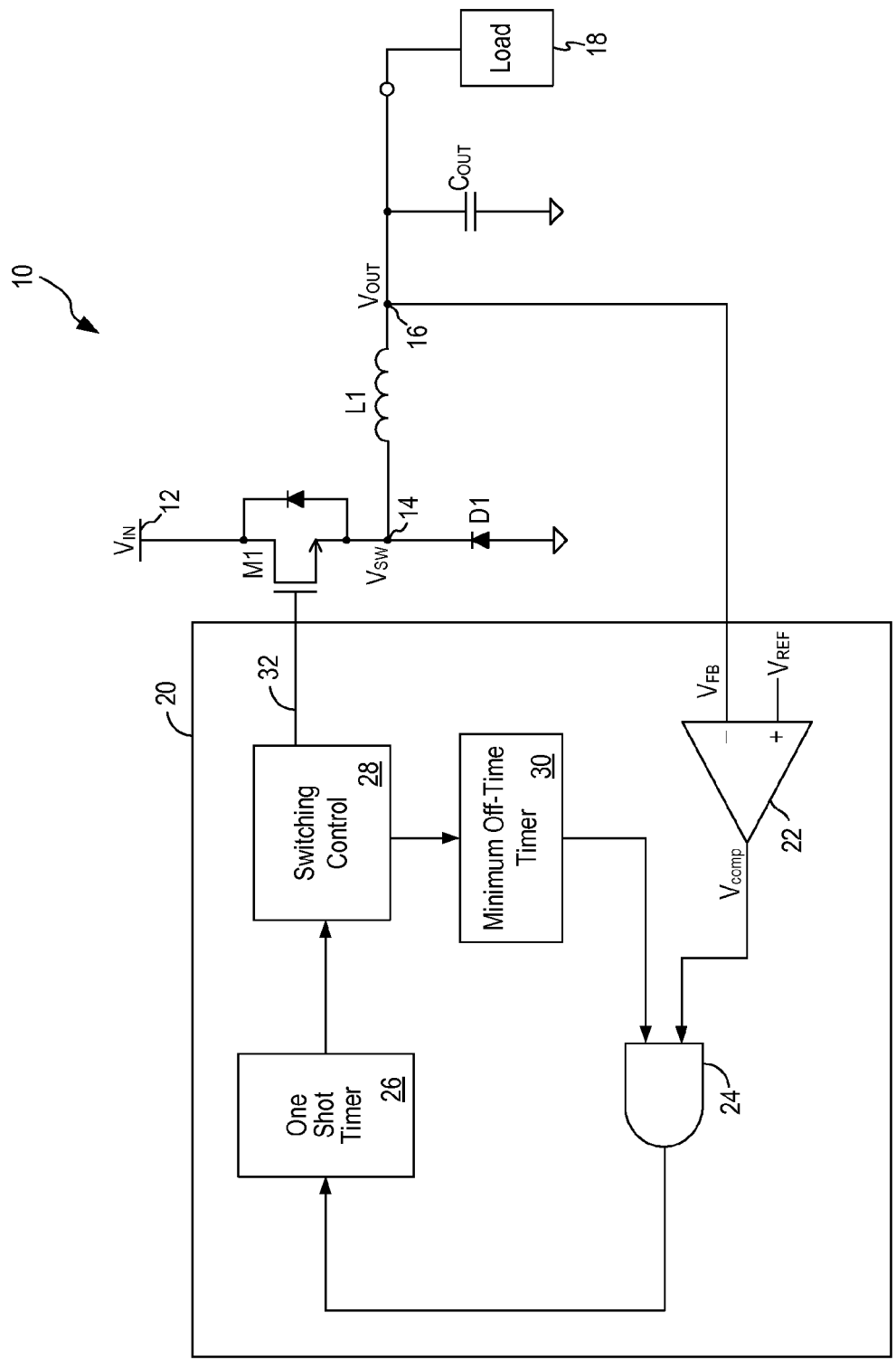
FIG. 1 is a schematic diagram of a conventional switching regulator implementing a constant on-time control scheme.
Figure 2:
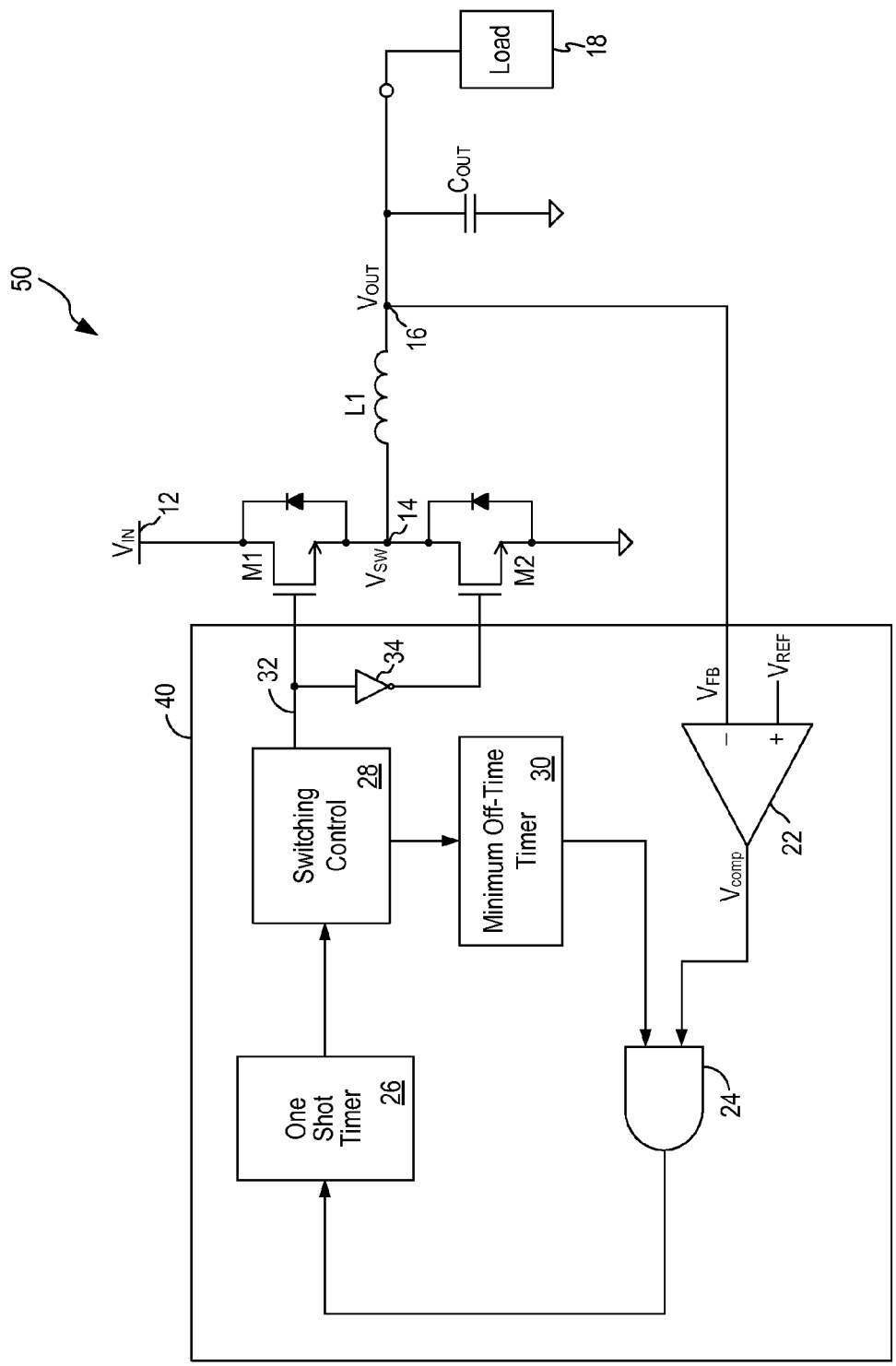
FIG. 2 is a schematic diagram of a conventional switching regulator implementing a constant on-time control scheme and synchronous rectification.
Figure 3:
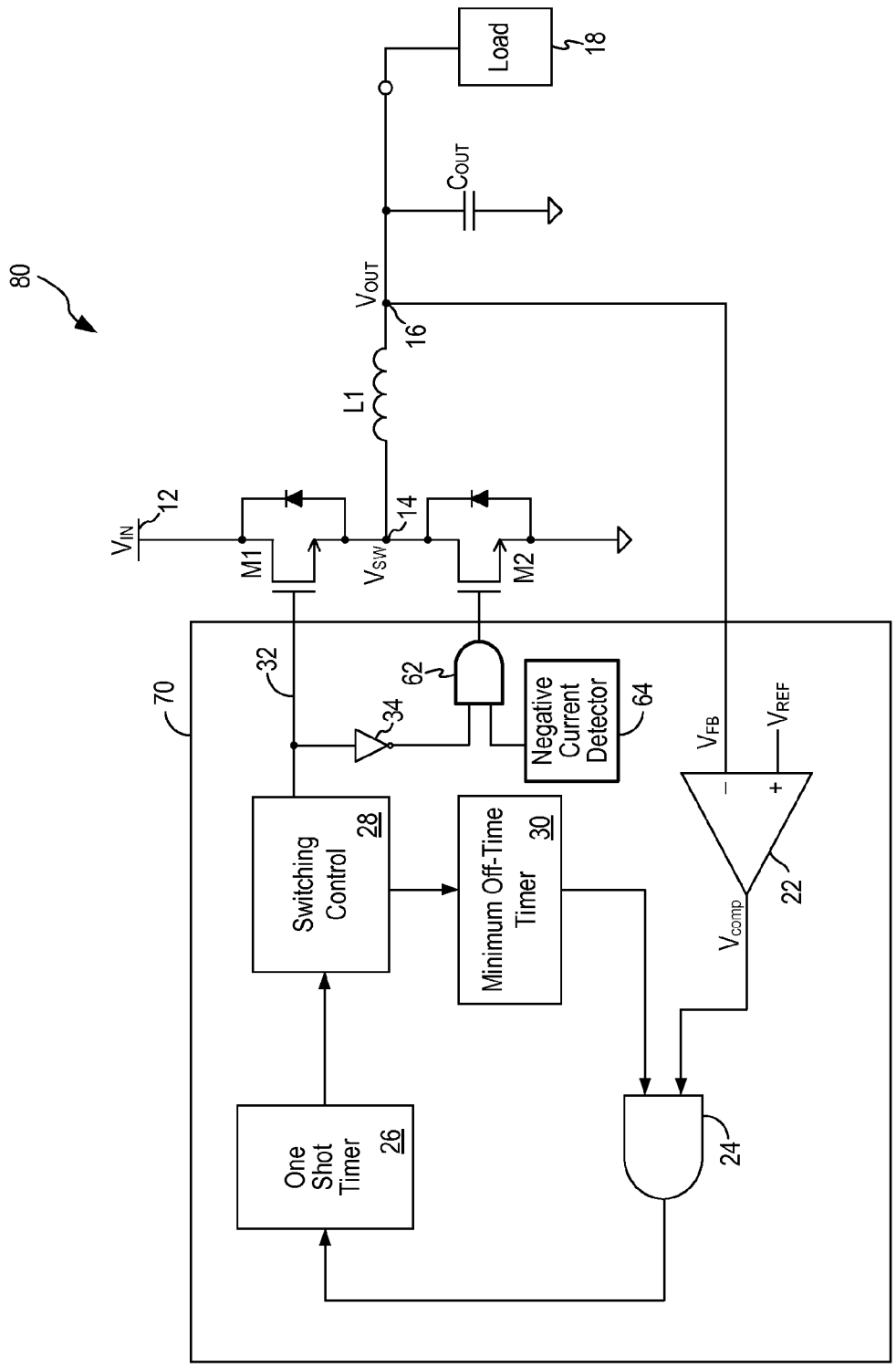
FIG. 3 is a schematic diagram of a conventional switching regulator implementing a constant on-time control scheme and synchronous rectification with negative current detection.
Figure 6:
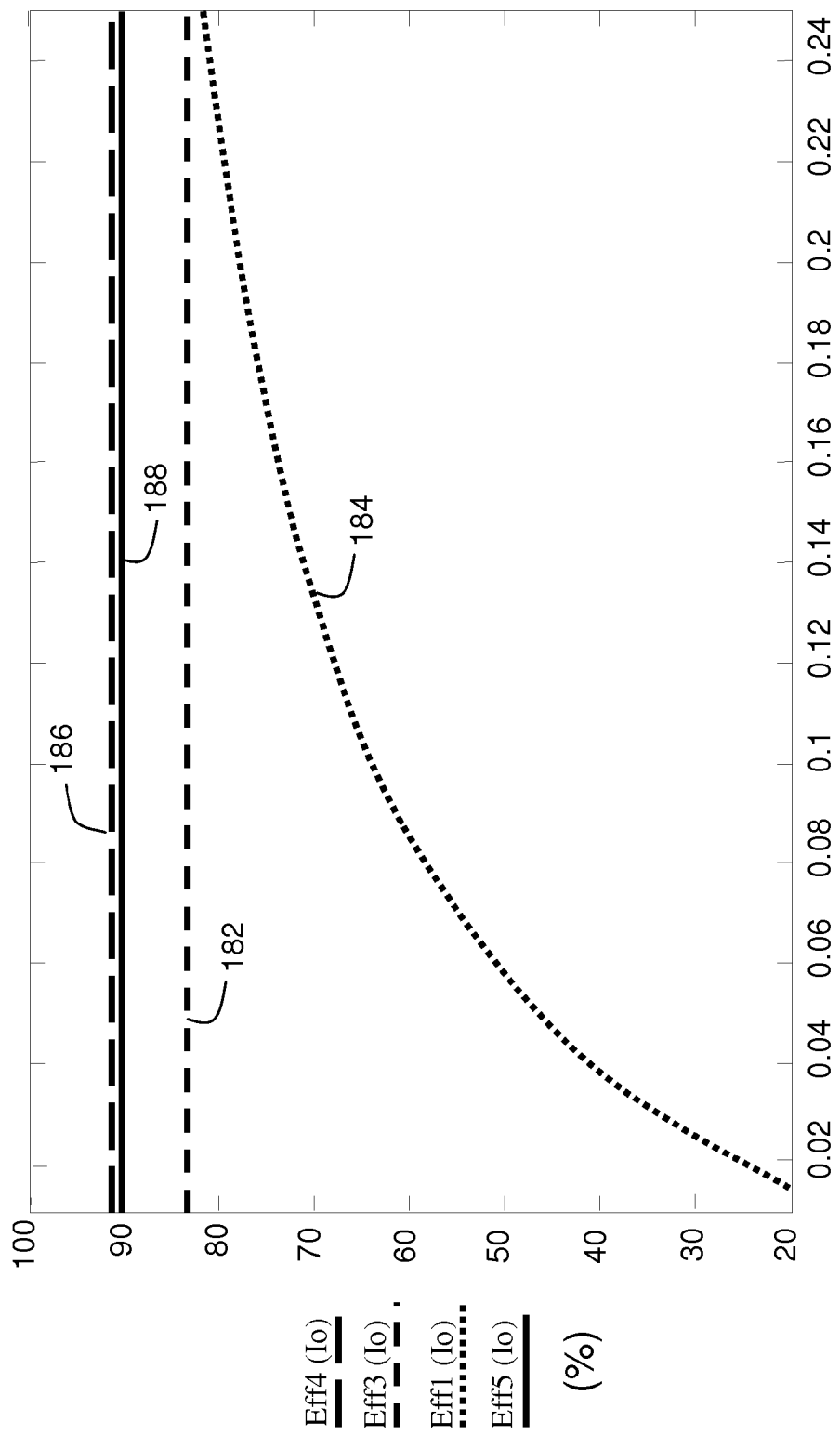
FIG. 6 contains simulation results illustrating the efficiency of the conventional switching regulators in FIGS. 1, 2 and 3 as compared to the switching regulator of FIG. 4 using dual control loops.

FIG. 6 contains simulation results illustrating the efficiency of the conventional switching regulators in FIGS. 1, 2 and 3 as compared to the switching regulator of FIG. 4 using dual control loops. Referring to FIG. 6, curve 182 illustrates the efficiency performance for the switching regulator 10 of FIG. 1 using constant on-time control scheme without synchronous rectification. As shown by curve 182, switching regulator 10 has consistent efficiency performance for light load and heavy load conditions but the overall efficiency level is low due to power dissipation through the diode. Curve 184 illustrates the efficiency performance for the switching regulator 50 of FIG. 2 using constant on-time control scheme with synchronous rectification. As shown by curve 184, when synchronous rectification is used, the light load efficiency performance becomes degraded. Curve 186 illustrates the efficiency performance for the switching regulator 80 of FIG. 3 using constant on-time control scheme with synchronous rectification and negative current detection. As shown by curve 184, when synchronous rectification with negative current detection is used, the efficiency performance at light load condition is improved and the overall efficiency is good.

Curve 188 illustrates the efficiency performance for the switching regulator 100 of the present invention using constant on-time control scheme with synchronous rectification and dual control loop. As shown by curve 188, the efficiency performance of the switching regulator 100 is comparable to that of the switching regulator 80 using negative current detection. However, the switching regulator 100 of the present invention also ensures improved transient response as shown in FIG. 5(b), which is a result not achievable by the conventional switching regulator circuit 80 of FIG. 3, as shown in FIG. 5(a).

Figure 7:
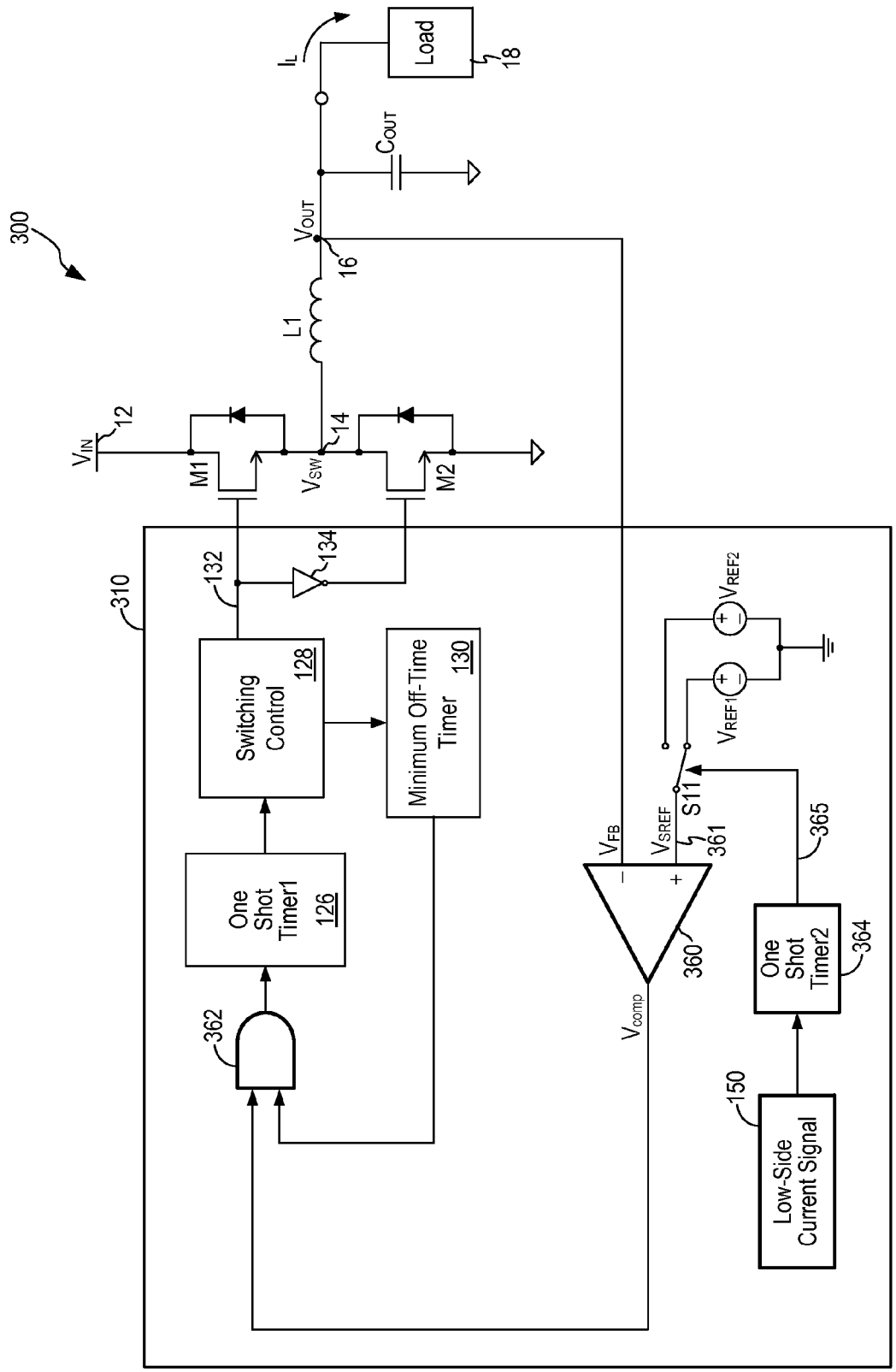
FIG. 7 is a schematic diagram of a switching regulator implementing synchronous rectification and constant on-time control scheme and incorporating an integrated standard and light load control loop according to one embodiment of the present invention.

FIG. 7 is a schematic diagram of a switching regulator implementing synchronous rectification and constant on-time control scheme and incorporating an integrated standard and light load control loop according to one embodiment of the present invention. Referring to FIG. 7, a switching regulator 300 includes a regulator control circuit 310 driving a main power switch M1 and a low-side power switch M2 connected in series between the input voltage $V_{IN}$ (node 12) and ground. In the present embodiment, power switches M1 and M2 are both NMOS transistors and the low-side power switch M2 is controlled by the inverse of a drive signal (node 132) driving the main power switch M1. For instance, the drive signal at node 132 may be inverted by an inverter 134 and the inverted drive signal is coupled to drive the low-side power switch M2. Thus, the low-side power switch M2 is turned on when the main power switch M1 is turned off and vice versa. The power switches M1 and M2 are turned on and off to generate a switching voltage $V_{SW}$ on a common node 14. The switching voltage $V_{SW}$ at node 14 drives an output LC filter circuit formed by an inductor L1 and an output capacitor $C_{OUT}$. The output LC filter circuit generates a DC output voltage $V_{OUT}$ at an output voltage node 16 having substantially constant magnitude. In operation, the output voltage $V_{OUT}$ is coupled to drive a load 18.

The regulator control circuit 310 is configured to drive the main power switch M1 and the low-side power switch M2 based on a constant on-time control scheme. Under the constant on-time control scheme, the main power switch M1 is turned on for a fixed time duration as determined by an one-shot timer1 126 and then power switch M1 is turned off for at least a minimum amount of off-time as determined by the minimum off-time timer 130. In operation, the one-shot timer1 126 generates control signals for a switching control circuit 128 which generates the drive signal (node 132) for turning on the main power switch M1, and thus turning off the low-side power switch M2. When the fixed on-time duration set by the one-shot timer1 126 expires, the switching control circuit 128 generates the drive signal (node 132) to turn off the main power switch M1, and thus turning on the low-side power switch M2. The switching control circuit 128 also sends a signal to trigger the minimum off-time timer 130 to count down the predetermined minimum off-time duration. The minimum off-time timer 130 asserts a minimum off-time output signal when the minimum off-time timer expires, that is, the minimum off-time duration has passed.

In embodiments of the present invention, the regulator control circuit 310 implements an integrated standard and light load control loop to regulate the output voltage $V_{OUT}$ at the output node 16. A feedback circuit is formed by coupling the output voltage $V_{OUT}$ (node 16) back to the regulator control circuit 310 as a feedback voltage $V_{FB}$. The feedback voltage $V_{FB}$ is coupled to the integrated standard and light load control loop to implement output voltage regulation.

More specifically, in the integrated standard and light load control loop, the feedback voltage $V_{FB}$ is coupled to a first input terminal of a voltage comparator 360 to be compared with a selected reference voltage $V_{SREF}$ provided to the second input terminal (node 361) of the voltage comparator 360. In the present embodiment, the feedback voltage $V_{FB}$ is coupled to the negative input terminal while the selected reference voltage $V_{SREF}$ is coupled to the positive input terminal of the voltage comparator 360. The output signal $V_{COMP}$ of the voltage comparator 360 is asserted (logical high) when the feedback voltage $V_{FB}$ drops below the selected reference voltage $V_{SREF}$. In the present embodiment, the comparator output signal $V_{COMP}$ is coupled to a first input terminal of an AND gate 362 as the first input signal.

AND gate 362 also receives the minimum off-time signal from timer 130 as the second input signal. When both the comparator output signal $V_{COMP}$ and the minimum off-time signal are asserted, the output of the AND gate 362 is asserted. The output of AND gate 362 is coupled to drive the one shot timer1 126. Thus, when the minimum off-time has expired and when the feedback voltage $V_{FB}$ has dropped below the selected reference voltage $V_{SREF}$, the one shot timer1 is triggered and the switching control circuit 128 acts in response to generate the drive signal (node 132) to turn on the main power switch M1.

The integrated standard and light load control loop includes a reference voltage selection circuit operative to select a first reference voltage for standard load control and a second reference voltage for light load control. In this manner, the integrated standard and light load control loop operates during light load conditions to improve light load efficiency and enhance transient response. More specifically, the reference voltage selection circuit includes an one shot timer2 364 triggered by a low-side current signal 150. The low-side current signal 150 is asserted when a light load condition is detected. The output signal of the one shot timer2 364 controls a switch S11 for selecting one of a first reference voltage $V_{REF1}$ for standard load condition and a second reference voltage $V_{REF2}$ for light load condition as the selected reference voltage $V_{SREF}$. Accordingly, an appropriate reference voltage is selected as the selected reference voltage $V_{SREF}$ based on the detected load condition.

In embodiments of the present invention, the low-side current signal 150 is indicative of the current flowing through the drain-to-source terminal of the power switch M2. In embodiments of the present invention, the low-side current signal 150 may be generated by a current monitoring circuit (not shown), such as a circuit monitoring the drain-to-source voltage (Vds) of the power switch M2. When the switching regulator 300 experiences a light load condition, the current throwing through the power switch M2 drops. In one embodiment, the low-side current signal 150 is asserted when the current flowing through the power switch M2 drops below a given threshold level, indicating a light load condition.

In operation, during normal load condition, the one shot timer2 364 is not triggered and the one shot timing signal on node 365 is not asserted. In that case, switch S11 is in a first position to select the first reference voltage $V_{REF1}$. However, when a light load condition is detected and the low-side current signal 150 is asserted, the one shot timer2 364 is triggered to generate a one-shot timing signal on node 365 having a predetermined duration. The one-shot timing signal on node 365 is coupled to control the switch S11 to cause switch S11 to switch to a second position to select the second reference voltage $V_{REF2}$ as the selected reference voltage $V_{SREF}$. In this manner, the integrated standard and light load control loop operates to regulate the output voltage $V_{OUT}$ based on either the first reference voltage $V_{REF1}$ for standard load condition and the second reference voltage $V_{REF2}$ for light load condition.

In embodiments of the present invention, the reference voltage $V_{REF2}$ has a voltage value greater than the reference voltage $V_{REF1}$. The reference voltage $V_{REF2}$ defines an upper voltage level that the output voltage $V_{OUT}$ can reach during light load conditions.

The operation of the integrated standard and light load control loop will now be described in detail. When the load condition at the output node 16 is normal or heavy, the current flow through the power switch M2 is sufficiently large so that the low-side current signal 150 will not be asserted. The one-shot timing signal (node 365) is accordingly not asserted and thus the switch S11 in the reference voltage selection circuit selects the first reference voltage $V_{REF1}$. In this manner, the standard control loop controls the operation of the power switches M1 and M2 through the constant on-time control scheme with synchronous rectification. That is, the main power switch M1 is turned on (the low-side power switch M2 turned off) for a fixed on-time duration as determined by the one-shot timer1 126. The main power switch M1 is then turned off for at least the minimum off-time as determined by the minimum off-time timer 130. Meanwhile, the low-side power switch M2 is turned on. After the minimum off-time, when the output voltage $V_{OUT}$ is greater than the reference voltage $V_{REF1}$, the main power switch remains turned off. When the output voltage $V_{OUT}$ drops lower than the reference voltage $V_{REF1}$, then the output signal $V_{COMP}$ is asserted. When the minimum off-time has expired, the output signal of AND gate 362 is then asserted to trigger the one-shot timer1 126 to cause the main power switch M1 to be turned on for another fixed on-time duration. The operation of the standard control loop with synchronous rectification continues.

However, when the switching regulator 300 experiences a light load condition at the output node 16, the light load control loop is activated. First, the low-side current signal 150 is asserted to trigger one-shot timer2 364 which causes one-shot timing signal (node 365) to be asserted. The switch S11 in the reference voltage selection circuit selects the second reference voltage $V_{REF2}$. Because the second reference voltage $V_{REF2}$ is greater than the first reference voltage $V_{REF1}$, as long as the output voltage $V_{OUT}$ fed back as the feedback voltage $V_{FB}$ has not increased very much, the output signal $V_{COMP}$ of the comparator 306 is immediately asserted after the switch S11 selects the second reference voltage. Then, as soon as the minimum off-time expires, the output signal of AND gate 362 is asserted to trigger the one-shot timer1 126 to cause the main power switch M1 to be turned on for another fixed on-time duration. Accordingly, the light load control loop will cause the main power switch M1 to turn on during light load conditions (and the low-side power switch M2 is turned off) to regulate the output voltage $V_{OUT}$ to a higher voltage value as related to the reference voltage $V_{REF2}$, which has the effect of increasing the efficiency and also improving the transient response of the switching regulator 300.

Figure 8:
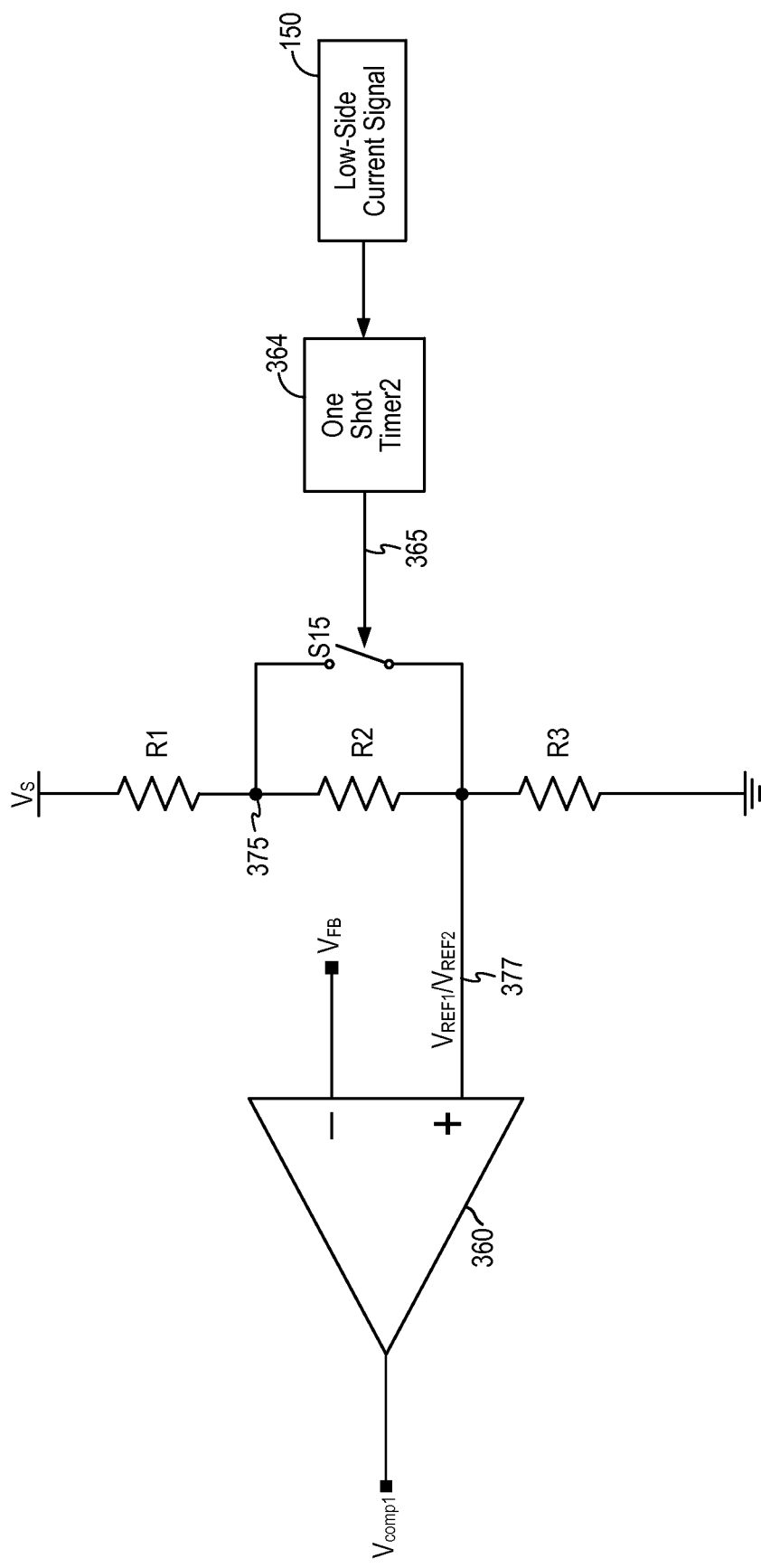
FIG. 8 is a schematic diagram illustrating the implementation of the reference voltage selection circuit according to one embodiment of the present invention.

The reference voltage selection circuit in the integrated standard and light load control loop of the switching regulator controller in FIG. 7 can be implemented in various manner to select one of two reference voltages. FIG. 8 is a schematic diagram illustrating the implementation of the reference voltage selection circuit according to one embodiment of the present invention. Referring to FIG. 8, the first and second reference voltages are generated using a voltage divider coupled to divide a reference voltage $V_s$. The voltage divider includes a string of three resistors R1, R2 and R3. A switch S15 is coupled between a first node between resistors R1 and R2 (node 375) and a second node between resistors R2 and R3 (node 377). The switch S15 is open or closed to generate the first and second reference voltage values at node 377.

More specifically, when the one-shot timing signal (node 365) is asserted, switch S15 is closed and resistor R2 is shorted out. The first reference voltage $V_{REF2}$ is generated at comparator input node 377 have a voltage value of $$\frac{R3}{R1+R3}V_S.$$

On the other hand, when the one-shot timing signal (node 365) is deasserted, switch S15 is open to include resistor R2 in the voltage divider. The first reference voltage $V_{REF1}$ is generated at comparator input node 377 have a voltage value of $$\frac{R3}{R1+R2+R3}V_S.$$

By using a voltage divider to divide a reference voltage $V_S$, the reference voltages $V_{REF1}$ and $V_{REF2}$ can be selectively generated. In one embodiment, the reference voltage $V_S$ is a bandgap voltage so that the reference voltages $V_{REF1}$ and $V_{REF2}$ are independent of power supply voltage variations.

In the above-described embodiments, the output voltage $V_{OUT}$ is fed back directly to the regulator control circuit as a feedback voltage $V_{FB}$. The direct fed back of the output voltage $V_{OUT}$ is illustrative only and is not intended to be limiting. In other embodiments of the present invention, the output voltage $V_{OUT}$ may be stepped down, such as through the use of a voltage divider before being coupled back to the regulator control circuit as the feedback voltage $V_{FB}$. When the output voltage $V_{OUT}$ is stepped down, the reference voltages $V_{REF1}$ and $V_{REF2}$ will accordingly be scaled down by the corresponding amount.

The above detailed descriptions are provided to illustrate specific embodiments of the present invention and are not intended to be limiting. Numerous modifications and variations within the scope of the present invention are possible. The present invention is defined by the appended claims.

I claim:

1. A control circuit for a switching regulator receiving an input voltage, the control circuit controlling a main switch and a low-side switch using a constant on-time control scheme to drive a switch output node for generating a switching output voltage, the switch output node being coupled to an LC filter circuit to generate a regulated output voltage having a substantially constant magnitude on an output node, the regulated output voltage being fed back to the control circuit as a feedback voltage, the control circuit comprising:

a first one-shot timer configured to generate a control signal indicative of a fixed on-time duration of the main switch, the control signal being applied to turn on the main switch while turning off the low-side switch and to turn off the main switch after the fixed on-time duration has expired while turning on the low-side switch;

a minimum off-time timer configured to generate a minimum off-time signal having a first state when the main switch has been turned off for a minimum off-time duration;

a reference voltage selection circuit configured to select, based on a low-side current signal, a first reference voltage for standard load condition and a second reference voltage for light load condition as a selected reference voltage, the low-side current signal having a first state indicative of a light load condition at the output node and the second reference voltage being greater than the first reference voltage; and a control loop configured to control the first one-shot timer to generate the control signal to turn on the main switch when the feedback voltage is below the selected reference voltage and the minimum off-time signal has the first state, the selected reference voltage being selected from the first reference voltage and the second reference voltage, wherein the control loop regulates the regulated output voltage based on the selected reference voltage and the regulated output voltage during light load conditions is maintained at a voltage level greater than the regulated output voltage maintained during normal or heavy load conditions.

2. The control circuit of claim 1, further comprising:

a switching control circuit configured to drive the main switch and the low-side switch in response to the control signal from the first one-shot timer, the switching control circuit generating a drive signal to turn on the main switch while turning off the low-side switch and to turn off the main switch while turning on the low-side switch.

3. The control circuit of claim 1, wherein the control loop comprises:

a voltage comparator having a first input terminal coupled to receive the feedback voltage, a second input terminal coupled to receive the selected reference voltage and an output terminal generating a comparator output voltage having a first state when the feedback voltage is less than the selected reference voltage; and a logical AND gate having a first input terminal coupled to receive the comparator output voltage of the voltage comparator and a second input terminal coupled to receive the minimum off-time signal of the minimum off-time timer, the logical AND gate generating an output signal having a first state when the comparator output voltage and the minimum off-time signal both have the first state, wherein the first one-shot timer generates the control signal to turn on the main switch when the output signal of the logical AND gate has the first state.

4. The control circuit of claim 1, wherein the reference voltage selection circuit comprises:

a second one-shot timer configured to generate a second control signal having a first state for a predetermined duration as triggered by the low-side current signal having the first state indicative of a light load condition at the output node and having a second state otherwise; and a switch controlled by the second control signal, the switch having a first position selecting the first reference voltage as the selected reference voltage when the second control signal has the second state, and the switch having a second position selecting the second reference voltage as the selected reference voltage when the second control signal has the first state.

5. The control circuit of claim 4, wherein the reference voltage selection circuit further comprises:

first, second and third resistors connected in series between a first voltage and a ground potential, the switch being connected in parallel with the second resistor and the first and second reference voltages being generated at a node between the second and third resistors, wherein the switch is closed at the first position to short out the second resistor and to generate the first reference voltage having a voltage value proportional to the resistances of the first and third resistors; and wherein the switch is open at the second position to generate the second reference voltage having a voltage value proportional to the resistances of the first, second and third resistors.

6. The control circuit of claim 5, wherein the first voltage comprises a bandgap voltage.

7. The control circuit of claim 1, wherein the low-side current signal detects a light load condition at the output node by monitoring a current flow through the low-side switch, the low-side current signal having the first state when the current flow through the low-side switch is below a predetermined threshold level.

8. The control circuit of claim 7, wherein the low-side switch comprises a MOSFET device and the low-side current signal is generated by monitoring a voltage across a drain terminal and a source terminal of the MOSFET device to determine the current flowing through the low-side switch.

9. The control circuit of claim 1, wherein the feedback voltage is a divided down voltage of the regulated output voltage.

10. The control circuit of claim 1, wherein the second reference voltage has a voltage value for regulating the regulated output voltage to a voltage value greater than a voltage value of the regulated output voltage during normal or heavy load conditions.

11. A method in a switching regulator receiving an input voltage and controlling a main switch and a low-side switch using a constant on-time control scheme to drive a switch output node for generating a switching output voltage, the switch output node being coupled to an LC filter circuit to generate a regulated output voltage having a substantially constant magnitude on an output node, the regulated output voltage being fed back to the switching regulator as a feedback voltage, the method comprising:

turning on the main switch for a fixed on-time duration and turning off the low-side switch in response to a control signal;

turning off the main switch for a minimum off-time duration and turning on the low-side switch in response to the control signal;

selecting, based on a low-side current signal, a first reference voltage for standard load condition and a second reference voltage for light load condition as a selected reference voltage, the low-side current signal having a first state indicative of a light load condition at the output node and the second reference voltage being greater than the first reference voltage; and generating the control signal to turn on the main switch based on a control loop when the feedback voltage is below the selected reference voltage and the minimum off-time duration has expired, the selected reference voltage being selected from the first reference voltage and the second reference voltage, wherein the control loop regulates the regulated output voltage based on the selected reference voltage and the regulated output voltage during light load conditions is maintained at a voltage level greater than the regulated output voltage maintained during normal or heavy load conditions.

12. The method of claim 11, wherein generating the control signal to turn on the main switch based on a control loop comprises:

comparing the feedback voltage to the selected reference voltage;

generating a comparator output signal having a first state when the feedback voltage is less than the selected reference voltage; and generating the control signal to turn on the main switch when the comparator output signal has the first state and when the minimum off-time duration has expired.

13. The method of claim 11, wherein selecting, based on a low-side current signal, a first reference voltage for standard load condition and a second reference voltage for light load condition as a selected reference voltage comprises:

generating a second control signal having a first state for a predetermined duration as triggered by the low-side current signal having the first state indicative of a light load condition at the output node and having a second state otherwise;

selecting the first reference voltage as the selected reference voltage when the second control signal has the second state; and selecting the second reference voltage as the selected reference voltage when the second control signal has the first state.

14. The method of claim 11, further comprising:

monitoring a current flow through the low-side switch, the low-side current signal having the first state when the current flow through the low-side switch is below a predetermined threshold level.

15. The method of claim 14, wherein the low-side switch comprises a MOSFET device and monitoring a current flow through the low-side switch comprises:

monitoring a voltage across a drain terminal and a source terminal of the MOSFET device to determine the current flowing through the low-side switch.

16. The method of claim 11, wherein the feedback voltage is a divided down voltage of the regulated output voltage.

17. The method of claim 11, wherein the second reference voltage has a voltage value for regulating the regulated output voltage to a voltage value greater than a voltage value of the regulated output voltage during normal or heavy load conditions.

* * * * *